US009639122B2

(12) United States Patent
Choi et al.

(10) Patent No.: US 9,639,122 B2
(45) Date of Patent: May 2, 2017

(54) STRETCHABLE DISPLAY

(71) Applicant: Samsung Display Co., Ltd., Yongin, Gyeonggi-do (KR)

(72) Inventors: Wonil Choi, Ansan-si (KR); Jongho Hong, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 35 days.

(21) Appl. No.: 14/694,630

(22) Filed: Apr. 23, 2015

(65) Prior Publication Data

US 2016/0147327 A1     May 26, 2016

(30) Foreign Application Priority Data

Nov. 24, 2014     (KR) .......................... 10-2014-0164612

(51) Int. Cl.
*G06F 1/16*     (2006.01)
(52) U.S. Cl.
CPC .......... *G06F 1/1652* (2013.01); *G06F 1/1624* (2013.01); *G06F 1/1626* (2013.01)
(58) Field of Classification Search
None
See application file for complete search history.

(56) References Cited

U.S. PATENT DOCUMENTS

| 7,830,333 | B2 | 11/2010 | Aoki |
| 8,199,471 | B2 | 6/2012 | Bemelmans et al. |
| 8,552,299 | B2 | 10/2013 | Rogers et al. |
| 2010/0232094 | A1* | 9/2010 | Chen ..................... G06F 1/1618 361/679.01 |
| 2010/0295761 | A1 | 11/2010 | van Lieshout et al. |
| 2013/0021762 | A1 | 1/2013 | van Dijk et al. |
| 2015/0370413 | A1* | 12/2015 | Cho ...................... G06F 3/0418 345/178 |

FOREIGN PATENT DOCUMENTS

| JP | 5345209 B2 | 8/2013 |
| KR | 10-2009-0058614 A | 6/2009 |
| KR | 10-1227644 B1 | 1/2013 |

OTHER PUBLICATIONS

Kim et al., "Negatively Strain-Dependent Electrical Resistance of Magnetically Arranged Nickel Composites: Application to Highly Stretchable Electrodes and Stretchable Lighting Devices," *Adv. Mater.* 2014, 26, pp. 3094-3099.

* cited by examiner

*Primary Examiner* — Nicholas Lee
(74) *Attorney, Agent, or Firm* — Knobbe Martens Olson & Bear LLP

(57) ABSTRACT

A stretchable display is disclosed. In one aspect, the stretchable display includes a display unit that is stretchable and a rotation member arranged below the display unit and connected to the display unit. The rotation member is configured to tension the display unit. The stretchable display further includes a fixing member arranged below the rotation member and defining a rotation axis. The rotation member is further configured to rotate about the rotation axis so as to tension the display unit.

19 Claims, 6 Drawing Sheets

STRETCHABLE DISPLAY

CROSS-REFERENCE TO RELATED APPLICATION

This U.S. non-provisional patent application claims priority under 35 U.S.C. §119 of Korean Patent Application No. 10-2014-0164612, filed on Nov. 24, 2014, the contents of which are hereby incorporated by reference in its entirety.

BACKGROUND

Field

The described technology generally relates to a display device that can be easily tensioned.

Description of the Related Technology

Recent improvements in display devices include the development of flexible displays that can be bent or rolled and stretchable displays that can be stretched in at least one direction. Such display devices can be deformed to a predetermined shape or to form various shapes.

Stretchable displays can display images even when the displays are stretched by external forces. Stretchable displays include an elastic substrate and electrical components formed thereon. For instance, the elastic substrate is formed of an elastic material such as polydimethylsiloxane (PDMS).

SUMMARY OF CERTAIN INVENTIVE ASPECTS

One inventive aspect is a display device that can be easily tensioned.

Another aspect is a display device including a display part that is stretchable, a rotation member arranged under the display part and connected to the display part to tension the display part in a predetermined direction, and a fixing member arranged under the rotation member to provide the rotation member with a rotation axis. The rotation member rotates in a predetermined direction by an external force with respect to a center portion of the fixing member as the rotation axis to tension the display part.

The display part includes a display panel including a display area and a non-display area arranged in the vicinity of the display area and being stretchable and a frame member having a frame shape corresponding to a shape of the display panel and accommodating the non-display area. The display panel includes long sides extending in a first direction and short sides extending in a second direction crossing the first direction.

The frame member includes a first frame member and a second frame member, which contact each other to form the frame shape and accommodate the non-display area, both sides in the first direction of the display panel are respectively connected to the first and second frame members, and the first and second frame members are separated from each other when the display panel is tensioned.

The first frame member includes a first extension part extending in the second direction and second and third extension parts respectively extending from both sides of the first extension part in the first direction. The second frame member includes a fourth extension part extending in the second direction and fifth and sixth extension parts respectively extending from both sides of the fourth extension part in the first direction and arranged to respectively face the second and third extension parts while contacting each other.

The non-display areas of the both sides of the display panel in the first direction are respectively connected to and fixed to the first extension part and the fourth extension part.

The first to sixth extension parts include a plurality of first grooves recessed from inner surfaces of the first to sixth extension parts to outer directions of the first to sixth extension parts and the non-display area of the display panel is inserted into the first grooves.

The second and third extension parts are respectively separated from the fifth and sixth extension parts when the display panel is tensioned.

The display device further includes a rotation plate including a plurality of moving holes, each extending in the first direction, arranged to overlap the frame member, and rotating in a predetermined direction by an external force, a plurality of first moving bars arranged on the rotation plate to respectively correspond to the moving holes, extending in the first direction, and connected to both sides of the frame member in the first direction, a plurality of second moving bars arranged under the rotation plate and extending in the first direction, a plurality of first pin units inserted in the moving holes of the rotation plate to connect each of the first moving bars to a corresponding second moving bar of the second moving bars, first and second rotation units arranged in the second direction, rotating in a same direction as a rotation direction, in which the rotation plate rotates, with respect to the center portion of the fixing member, and rotating in the same direction as the rotation direction of the rotation plate, and a plurality of second pin units connecting the second moving bars to the first and second rotation units.

The moving holes are respectively arranged at positions spaced apart inward from both sides of the rotation plate in the first direction, and the moving holes arranged adjacent to one side of the rotation plate in the first direction face the moving holes arranged adjacent to the other side of the rotation plate in a one-to-one correspondence.

A length in the first direction of the first and second moving bars is longer than a length in the first direction of the moving holes and a width in the second direction of the first and second moving bars is greater than a width in the second direction of the first and second moving bars.

The display device further includes a plurality of fixing units arranged on a first side of the first moving bar, which is toward to a boundary of the rotation plate among both sides of each of the first moving bars in the first direction, to connect the first sides of the first moving bars to both sides of the frame member in the first direction, respectively.

Each of the first moving bars includes a first hole arranged at a second side of the first moving bar, which is toward to a center portion of the rotation plate among the both sides of the first moving bar in the first direction, each of the second moving bars includes a second hole arranged at a first side of the second moving bar, which is toward to the boundary of the rotation plate among both sides of each of the second moving bars in the first direction, and a third holes arranged at a second side of the second moving bar, which is toward to the center portion of the rotation plate, and the second hole is arranged to overlap a corresponding first hole of the first holes.

Each of the first pin units has a substantially cylindrical shape elongated in a third direction substantially perpendicular to the first and second directions and is inserted into a corresponding first hole of the first holes, a corresponding moving hole of the moving holes, and a corresponding second hole of the second holes.

The display device further includes a plurality of pin coupling units connected to a lower portion of the first pin units.

Each of the first pin units is arranged at a second side of the corresponding moving hole among a first side of each of the moving holes, which is toward to the boundary of the rotation plate in the first direction, and the second side of each of the moving holes, which is toward to the center portion of the rotation plate.

Each of the first pin units moves back and forth between the first and second sides of the corresponding moving hole when the rotation plate rotates.

Each of first and second rotation units has a substantially cylindrical shape and is arranged within the boundary of the rotation plate in the second direction, and an outer circumference surface of the cylindrical shape of each of the first and second rotation units has a substantially saw-toothed wheel shape.

The first rotation unit includes a plurality of second grooves recessed downward from an upper surface of the first rotation unit, arranged in the second direction, and arranged respectively adjacent to both sides of the first rotation unit in the second direction. The second rotation unit includes a plurality of third grooves recessed downward from an upper surface of the second rotation unit, arranged in the second direction, and arranged respectively adjacent to both sides of the second rotation unit in the second direction. Each of the second and third grooves is arranged to overlap a corresponding third hole among the third holes.

Each of the second pin units has a substantially cylindrical shape elongated in a third direction substantially perpendicular to the first and second directions and is inserted into a corresponding third hole of the third holes and a corresponding groove of the second and third grooves.

The fixing member includes a fixing plate arranged to overlap the rotation plate, a supporting plate arranged at and fixed to a center portion of the fixing member, and a fixing gear part arranged at and fixed to a center portion of the supporting plate and having a substantially cylindrical shape elongated in the third direction. An outer circumference surface of the cylindrical shape of the fixing gear part has a saw-toothed wheel shape. A saw-toothed wheel of the outer circumference surface of the first and second rotation units is arranged to interlock with a saw-toothed wheel of the outer circumference surface of the fixing gear part.

Another aspect is a stretchable display comprising a display unit that is stretchable; a rotation member arranged below the display unit and connected to the display unit, wherein the rotation member is configured to tension the display unit; and a fixing member arranged below the rotation member and defining a rotation axis, wherein the rotation member is further configured to rotate about the rotation axis so as to tension the display unit.

In exemplary embodiments, the display unit can comprise a display panel comprising a display area and a non-display area surrounding the display area, wherein the display panel is stretchable; and a frame member having a frame shape corresponding to the shape of the display panel, wherein the frame member accommodates the non-display area, and wherein the display panel has a pair of long sides extending in a first direction and a pair of short sides extending in a second direction crossing the first direction. The frame member can comprise a first frame member and a second frame member which are configured to contact each other to form the frame shape and accommodate the non-display area, opposing sides of the display panel in the first direction can be respectively connected to the first and second frame members, and the first and second frame members can be configured to be separated from each other when the display unit is tensioned.

In exemplary embodiments, the first frame member comprises a first extension part extending in the second direction; and second and third extension parts respectively extending from opposing ends of the first extension part in the first direction, wherein the second frame member comprises: a fourth extension part extending in the second direction; and fifth and sixth extension parts respectively extending from opposing ends of the fourth extension part in the first direction, and wherein the fifth and sixth extension parts are configured to respectively contact the second and third extension parts. The non-display areas formed on opposing sides of the display panel in the first direction can be respectively connected to and fixed to the first extension part and the fourth extension part. Each of the first to sixth extension parts can comprise a first groove recessed from inner surfaces of the first to sixth extension parts, and the non-display area of the display panel can be inserted into the first grooves.

In exemplary embodiments, the second and third extension parts are configured to be respectively separated from the fifth and sixth extension parts when the display panel is tensioned. The display can further comprise a rotation plate comprising a plurality of slots, each extending in the first direction, wherein the rotation plate overlaps the frame member and is configured to rotate with respect to the fixing member; a plurality of first bars arranged on the rotation plate to respectively correspond to the slots, wherein the first bars extend in the first direction and are each connected to one of opposing sides of the frame member in the first direction; a plurality of second bars arranged below the rotation plate and extending in the first direction; a plurality of first pins respectively inserted in the slots of the rotation plate to connect each of the first moving bars to a corresponding one of the second moving bars; first and second gears arranged in the second direction and configured to rotate in the same direction as the rotation plate with respect to the fixing member; and a plurality of second pins respectively connecting the second bars to the first and second gears.

In exemplary embodiments, the slots are respectively formed at positions spaced apart from opposing sides of the rotation plate in the first direction, and wherein the slots formed adjacent to one side of the rotation plate in the first direction substantially directly oppose the slots formed adjacent to the opposing side of the rotation plate in a one-to-one correspondence. The length of the first and second bars in the first direction can be greater than the length of the slots in the first direction and the width of the first and second bars in the second direction can be greater than the width of the slots in the second direction.

In exemplary embodiments, each of the first bars has first and second sides opposing each other, wherein the display further comprises a plurality of fixing units respectively arranged on the first sides of the first bars, wherein the first sides of the first bars a closer to the periphery of the rotation plate than the second sides of the first bars in the first direction, and wherein the fixing units respectively connect the first sides of the first bars to the respective opposing side of the frame member in the first direction.

In exemplary embodiments, each of the first moving bars comprises a first hole formed in the second side thereof, wherein each of the second bars has first and second sides opposing each other, wherein each of the second bars comprises a second hole formed in the first side thereof, wherein the first sides of the second bars are closer to the periphery of the rotation plate than the second sides of the second bars in the first direction, wherein third holes are respectively formed in the second sides of the second moving bars, and wherein the second holes respectively overlap the first holes of the first bars.

In exemplary embodiments, each of the first pin units has a substantially cylindrical shape elongated in a third direction crossing the first and second directions and wherein each of the first pins is inserted into a corresponding one of the first holes, a corresponding one of the slots, and a corresponding one of the second holes. The display can further comprise a plurality of nuts respectively connected to lower portions of the first pins. Each of the slots can have first and second ends and each of the first pins can be configured to move back and forth between the first and second ends of the corresponding slot when the rotation plate rotates.

In exemplary embodiments, each of first and second gears has a substantially cylindrical shape and is arranged within the boundary of the rotation plate in the second direction, and wherein an outer circumference surface of each of the first and second gears has a substantially saw-toothed wheel shape.

In exemplary embodiments, the first gear comprises a plurality of second grooves recessed from an upper surface of the first gear and arranged in the second direction, wherein the second grooves are respectively formed adjacent to opposing sides of the first gear, wherein the second gear comprises a plurality of third grooves recessed from an upper surface of the second gear and arranged in the second direction, wherein the third grooves are respectively formed adjacent to opposing sides of the second gear, and wherein each of the second and third grooves overlaps a corresponding one of the third holes.

In exemplary embodiments, each of the second pin units has a substantially cylindrical shape elongated in a third direction crossing the first and second directions and wherein each of the second pins is inserted into a corresponding one of the third holes and a corresponding one of the second and third grooves.

In exemplary embodiments, the fixing member comprises a fixing plate overlapping the rotation plate; a supporting plate fixed to a center of the fixing plate; and a fixing gear attached to a center of the supporting plate and having a substantially cylindrical shape elongated in the third direction, wherein an outer circumference surface of the fixing gear has a saw-toothed wheel shape, and wherein the outer circumference surface of the first and second gears interlocks with the outer circumference surface of the fixing gear.

According to at least one embodiment, the display device can be easily tensioned.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF CERTAIN INVENTIVE EMBODIMENTS

Figure 1:
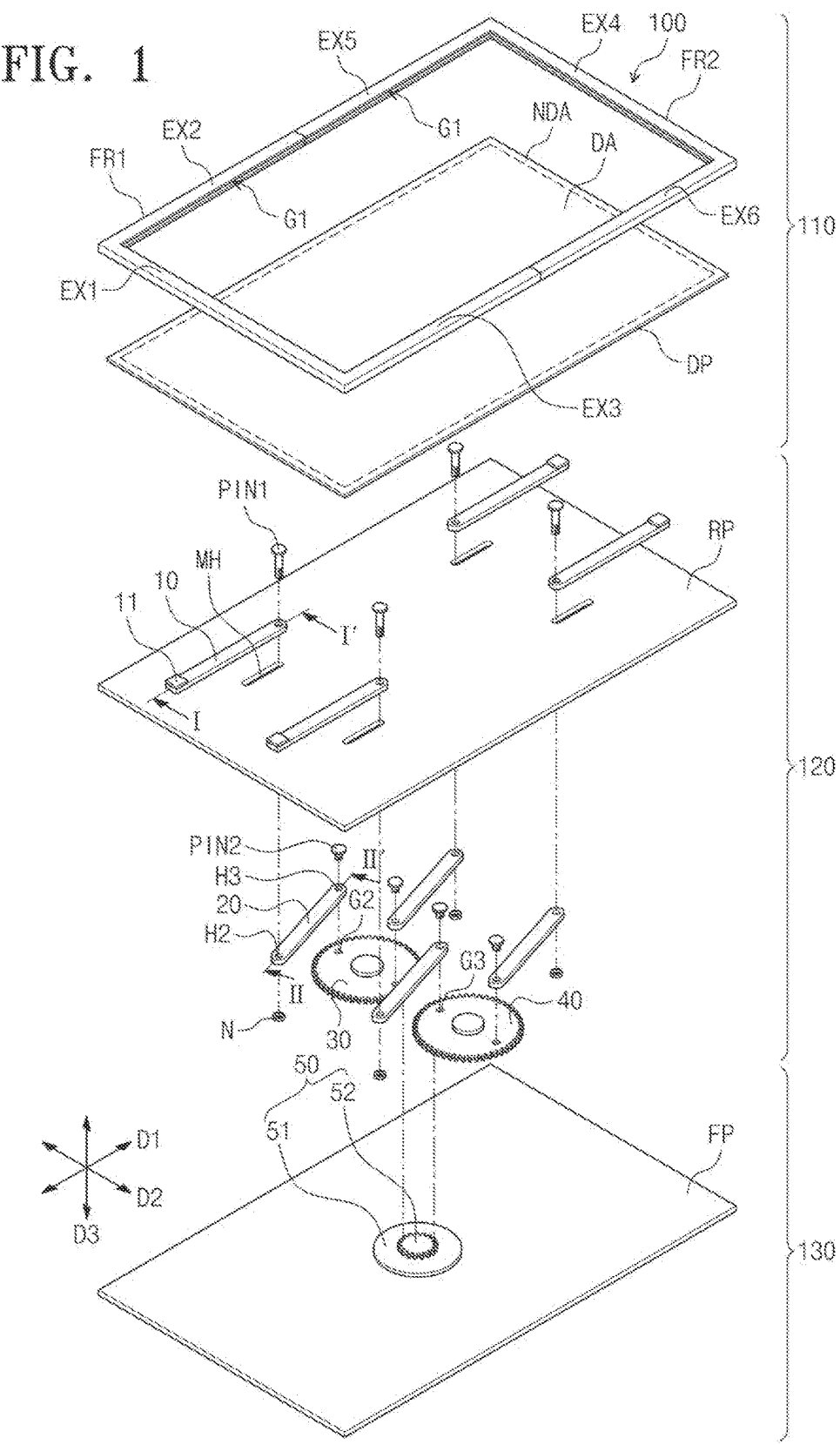
FIG. 1 is an exploded perspective view showing a display device according to an exemplary embodiment.

Stretchable displays have a plurality of metal lines which can be extended. For instance, such metal lines are used to connect the electrical components of the display and are formed on the surface of an elastic substrate while the substrate is pre-strained, i.e. under tension. These metal lines are thus formed to have a wave shape after the elastic substrate is contracted. When the elastic display device is tensioned, i.e. extended, the metal lines are unfolded from the wave shape. That is, these metal lines used for conducting electrical signals also enable the stretchable display to be extended.

Other stretchable displays include a stretchable conductive material instead of the wave-shaped metal lines. For instance, the stretchable conductive material can be a conductive polymer, a carbon nanotube, graphene, etc.

It will be understood that when an element or layer is referred to as being "on", "connected to" or "coupled to" another element or layer, it can be directly on, connected or coupled to the other element or layer or intervening elements or layers may also be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

FIG. 1 is an exploded perspective view showing a display device 100 according to an exemplary embodiment.

Referring to FIG. 1, the display device 100 includes a display part or display unit 110, a rotation member 120 arranged under the display part 110, and a fixing member 130 arranged under the rotation member 120.

The display part 110 is stretchable. The rotation member 120 is connected to the display part 110 and rotates in a predetermined direction to apply tension to the display part 110 in the predetermined direction.

The fixing member 130 provides the rotation member 120 with a rotation axis. The rotation member 120 rotates in a predetermined direction with respect to a center portion of the fixing member 130 to apply tension to the display part 110.

The display part 110 includes a display panel DP configured to display an image and frame members FR1 and FR2 that accommodate predetermined areas of a boundary of the display panel DP.

The display panel DP includes a display area DA configured to display the image and a non-display area NDA adjacent to the display area DA, in which no image is displayed. Although not shown in FIG. 1, a plurality of pixels are arranged in the display area DA in order to display the image and a driver is formed in the non-display area NDA to drive the pixels. The non-display area NDA of the display panel DP is accommodated in the frame members FR1 and FR2.

The display panel DP is stretchable. For instance, the display panel DP includes a substrate that is stretchable and electrical elements formed on the substrate.

The frame members FR1 and FR2 have a frame shape corresponding to the shape of the display panel DP. For instance, when the display panel DP has substantially a rectangular shape including long sides extending in a first direction D1 and short sides extending in a second direction D2 crossing the first direction D1, the frame members FR1 and FR2 have a substantially rectangular shape, i.e., a rectangular frame shape. However, the shape of the frame members FR1 and FR2 should not be limited to the rectangular frame shape.

The frame members FR1 and FR2 include a first frame member FR1, a second frame member FR2, and an opening area OP. The first and second frame members FR1 and FR2 contact each other to form the rectangular frame shape. The opening area OP corresponds to an inner area of the rectangular frame shape.

The non-display area NDA of the display panel DP is accommodated in the first and second frame members FR1 and FR2. The display area DA of the display panel DP is exposed through the opening area OP. As a result, the image displayed in the display area DA can be viewed by a user.

The first frame member FR1 includes a first extension part EX1, a second extension part EX2, and a third extension part EX3. The first extension part EX1 extends in the second direction D2. The second and third extension parts EX2 and EX3 are connected to opposing ends of the first extension part EX1 and extend in the first direction D1.

The second frame member FR2 includes a fourth extension part EX4, a fifth extension part EX5, and a sixth extension part EX6. The fourth extension part EX4 extends in the second direction D2. The fifth and sixth extension parts EX5 and EX6 are connected to opposing ends of the fourth extension part EX4 and extend in the first direction D1.

The fifth and sixth extension parts EX5 and EX6 face the second and third extension parts EX2 and EX3 in a one-to-one correspondence and respectively contact the second and third extension parts EX2 and EX3. When the display panel DP is tensioned, the fifth and sixth extension parts EX5 and EX6, which correspond to the second and third extension parts EX2 and EX3, are respectively separated from the second and third extension parts EX2 and EX3.

The first to sixth extension parts EX1 to EX6 include first grooves G1, which are recessed in inner surfaces of the first to sixth extension parts EX1 to EX6.

FIG. 1 shows the first groove G1 of each of the second, fourth, and fifth extension parts EX2, EX4, and EX5 since the frame members FR1 and FR2 are shown in a perspective view. In addition, each of the first, third, and sixth extension parts EX1, EX3, and EX6 includes the first groove G1.

The non-display areas NDA formed on opposing sides of the display panel DP in the first direction D1 are respectively inserted in and fixed to the first grooves G1 of the first and fourth extension parts EX1 and EX4.

The non-display areas NDA formed on opposing sides of the display panel DP in the second direction D2 are respectively inserted in the first grooves G1 of the second and fifth extension parts EX2 and EX5 and the first grooves G1 of the third and sixth extension parts EX3 and EX6.

When the display panel DP is tensioned in the first direction D1, the non-display areas NDA formed on opposing sides of the display panel DP in the second direction D2 move along the first grooves G1 of the second and fifth extension parts EX2 and EX5 and the first grooves G1 of the third and sixth extension parts EX3 and EX6.

That is, when the display panel DP is tensioned such that the short sides of the display panel DP are moved away from each other, the long sides of the display panel DP move along the first grooves G1 of the second and fifth extension parts EX2 and EX5 and the first grooves G1 of the third and sixth extension parts EX3 and EX6.

The rotation member 120 includes a rotation plate RP, a plurality of first moving bars or first bars 10, a plurality of fixing units 11, a plurality of first pin units or first pins PIN1, a plurality of second moving bars or second bars 20, a plurality of pin coupling units N, a plurality of second pin units or second pins PIN2, a first rotation unit or first gear 30, and a second rotation unit or second gear 40.

The rotation plate RP is arranged to overlap the frame members FR1 and FR2. The rotation plate RP includes a plurality of moving holes or slots MH. The moving holes MH are spaced apart inward from the sides of the rotation plate RP in the first direction D1 and extend in the first direction D1.

The number of the moving holes MH formed adjacent to one side of the rotation plate RP in the first direction D1 is substantially the same as the number of the moving holes MH formed adjacent to the other side of the rotation plate RP in the first direction D1. The moving holes MH formed adjacent to the one side of the rotation plate RP in the first direction D1 are formed to face the moving holes MH formed adjacent to the other side of the rotation plate RP in the first direction D1 in a one-to-one correspondence.

For instance, the rotation plate RP includes four moving holes MH. Two moving holes MH are formed adjacent to the one side of the rotation plate RP in the first direction D1 and the other two moving holes MH are formed adjacent to the other side of the rotation plate RP in the first direction D1. The two holes MH formed adjacent to the one side of the rotation plate RP in the first direction D1 are formed to respectively face the other two moving holes MH formed adjacent to the other side of the rotation plate RP in the first direction D1.

The first moving bars 10, the fixing units 11, and the first pin units PIN1 are arranged on the rotation plate RP. The first moving bars 10 extend in the first direction D1. The first moving bars 10 are connected to opposing sides of the frame members FR1 and FR2 in the first direction D1. The number of the first moving bars 10 arranged adjacent to the first frame member FR1 is substantially the same as the number of the first moving bars 10 arranged adjacent to the second frame member FR2.

In detail, the first moving bars 10 are arranged to correspond to the moving holes MH in a one-to-one correspondence. For instance, four first moving bars 10 are arranged to respectively correspond to the four moving holes MH. In some embodiments, length of the first moving bars 10 in the first direction D1 is greater than the length of the moving holes MH in the first direction D1. In some embodiments, the width of the first moving bars 10 in the second direction D2 is greater than the width of the moving holes MH in the second direction D2.

Hereinafter, one side of the first moving bars 10, which is closest to the periphery of the rotation plate RP in the first direction D1, is referred to as a first side of the first moving bars 10 and the other side of the first moving bars 10, which is closest to the center of the rotation plate RP is referred to as a second side of the first moving bars 10.

The fixing units 11 connect the first moving bars 10 to the frame members FR1 and FR2. For instance, each of the fixing units 11 is arranged on a corresponding first moving bar of the first moving bars 10. The fixing units 11 connect the first sides of the corresponding first moving bars 10 to the first extension part EX1 of the first frame member FR1 and the fourth extension part EX4 of the second frame member FR2.

In detail, the first sides of two first moving bars 10 arranged adjacent to the first frame member FR1 are connected to a lower portion of the first extension part EX1 of the first frame member FR1 by the two corresponding fixing units 11. The first sides of two first moving bars 10 arranged adjacent to the second frame member FR2 are connected to a lower portion of the fourth extension part EX4 of the second frame member FR2 by the two corresponding fixing units 11.

Each of the first moving bars 10 includes a first hole H1 formed in the second side of the first moving bar 10. Each of the first pin units PIN1 is arranged above a corresponding first hole H1 among the first holes H1 of the first moving bars 10. In some embodiments, each of the first pin units PIN1 has a substantially cylindrical shape elongated in a third direction D3 crossing the first and second directions D1 and D2.

The second moving bars 20, the pin coupling units N, the second pin units PIN2, and the first and second rotation units 30 and 40 are arranged under the rotation plate RP. The second moving bars 20 extend in the first direction D1. Hereinafter, one side of the second moving bars 20, which is closest to the periphery of the rotation plate RP in the first direction D1, is referred to as a first side of the second moving bars 20 and the other side of the second moving bars 20, which is closest to the center portion of the rotation plate RP is referred to as a second side of the second moving bars 20.

The second moving bars 20 are arranged to correspond to the first moving bars 10 in a one-to-one correspondence. In some embodiments, the length of the second moving bars 20 in the first direction D1 is longer than the length of the moving holes MH in the first direction D1. In some embodiments, the width of the second moving bars 20 in the second direction D2 is greater than the width of the moving holes MH in the second direction D2.

Each of the second moving bars 20 includes a second hole H2 formed in the first side of the second moving bar 20 and a third hole H3 formed in the second side of the second moving bar 20. Each of the second holes H2 of the second moving bars 20 is arranged to overlap with the first hole H1 of the corresponding first moving bar 10 among the first moving bars 10.

Each of the pin coupling units N is arranged under a corresponding second hole H2 of the corresponding second moving bar 20 among the second holes H2 of the second moving bars 20. The first pin units PIN1 can have a bolt shape and the pin coupling units N can have a nut shape.

Each of the first pin units PIN1 is inserted into the corresponding first hole H1 among the first holes H1 of the first moving bars 10, the corresponding moving hole MH among the moving holes MH, and the corresponding second hole H2 among the second holes H2 of the second moving bars 20. In addition, each of the pin coupling units N is connected to a lower portion of a corresponding first pin unit of the first pin units PIN1.

As a result, the second side of each of the first moving bar 10 is connected to the first side of the corresponding second moving bar 20. In addition, each of the firs pin units PIN1 moves back and forth along the corresponding moving hole MH among the moving holes MH in the first direction D1.

Each of the second pin units PIN2 is arranged above the third hole H3 of the corresponding second moving bar 20 among the third holes H3 of the second moving bars 20. In some embodiments, each of the second pin units PIN2 has a substantially cylindrical shape elongated in the third direction D3 crossing the first and second directions D1 and D2.

The first and second rotation units 30 and 40 are arranged in the second direction D2. The first and second rotation units 30 and 40 have a substantially cylindrical shape extending in the third direction D3. An outer circumference surface of the cylindrical shape of each of the first and second rotation units 30 and 40 has a saw-toothed wheel shape. The first and second rotation units 30 and 40 are arranged within the boundary of the rotation plate RP in the second direction D2.

The first rotation unit 30 includes a plurality of second grooves G2 recessed in the third direction D3 from an upper surface of the first rotation unit 30 and arranged in the second direction D2. The second grooves G2 are respectively arranged adjacent to opposing sides of the first rotation unit 30 in the second direction D2. That is, in the FIG. 1 embodiment, there are two second grooves G2.

The second rotation unit 40 includes a plurality of third grooves G3 recessed in the third direction D3 from an upper surface of the second rotation unit 40 and arranged in the second direction D2. The third grooves G3 are respectively arranged adjacent to opposing sides of the second rotation unit 40 in the second direction D2. That is, in the FIG. 1 embodiment, there are two of the third grooves G3.

The sum of the number of the second grooves G2 and the number of the third grooves G3 corresponds to the number of the third holes H3. Each of the second and third grooves G2 and G3 is arranged to overlap with the third hole H3 of the corresponding second moving bar 20 among the third holes H3 of the second moving bars 20.

Each of the second pin units PIN2 is inserted into the third hole H3 of the corresponding second moving bar 20 and a corresponding groove of the second and third grooves G2 and G3. As a result, the second moving bars 20 are connected to the first and second rotation units 30 and 40.

The fixing member 130 includes a fixing plate FP and a center axis member 50 fixed to a center portion of the fixing plate FP. The fixing plate FP is arranged to overlap the rotation plate RP. The center axis member 50 includes a supporting plate 51 fixed to a center portion of the fixing member 130 and a fixing gear part 52 fixed to a center portion of the supporting plate 51.

The fixing gear part 52 has a substantially cylindrical shape elongated in the third direction D3. An outer circumference surface of the cylindrical shape of the fixing gear part 52 has a saw-toothed wheel shape. The saw-toothed wheel of the outer circumference surface of the first and second rotation units 30 and 40 are arranged to interlock with the saw-toothed wheel of the outer circumference surface of the gear fixing part 52 in the second direction D2.

Figure 2:
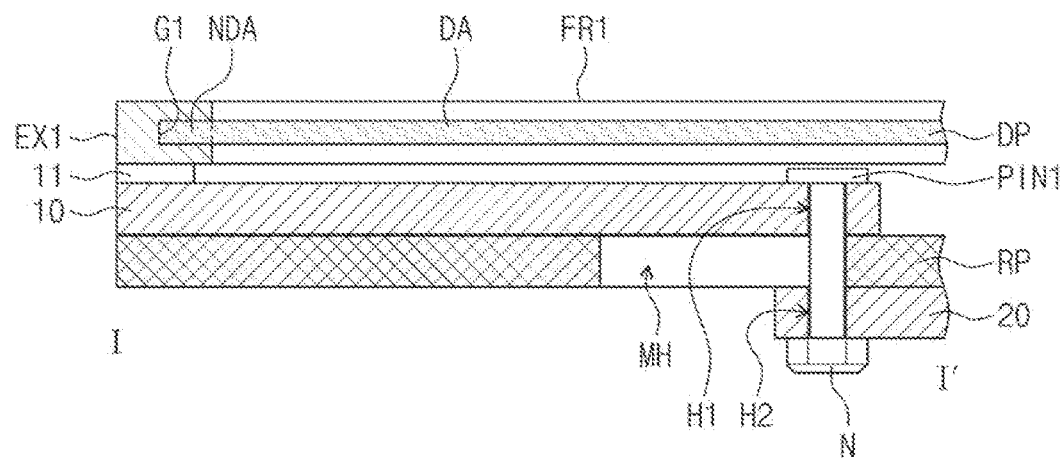
FIG. 2 is a cross-sectional view taken along line I-I' shown in FIG. 1.

FIG. 2 is a cross-sectional view taken along line I-I' shown in FIG. 1.

FIG. 2 shows the connection structure between the first moving bar 10 and the first frame member FR1 and the connection structure between the first moving bar 10 and the second moving bar 20. Accordingly, FIG. 2 shows the cross-sectional view of the first moving bar 10, the second moving bar 20, and the first frame member FR1 corresponding to the line I-I'.

Referring to FIG. 2, the non-display area NDA of the display panel DP is inserted into the first groove G1 of the first frame member FR1. The fixing unit 11 connects an upper portion of the first side of the first moving bar 10 to a lower portion of the first extension part EX1 of the first frame member FR1.

Although not shown in FIG. 2, the fixing units 11 not shown in FIG. 2 connect the first sides of the corresponding first moving bars 10 to the first extension part EX1 of the first frame member FR1 and the fourth extension part EX4 of the second frame FR2.

The first pin unit PIN1 is inserted into the first hole H1 of the corresponding first moving bar 10, the corresponding moving hole MH, and the second hole H2 of the corresponding second moving bar 20, and the pin coupling unit N is connected to the lower portion of the first pin unit PIN1.

The first pin units PIN1 not shown in FIG. 2 are inserted into the first holes H1 of the corresponding first moving bars 10, the corresponding moving holes MH, and the second holes H2 of the corresponding second moving bars 20 and connected to the pin coupling units N.

Hereinafter, one side of both sides of the moving holes MH, which is closest to the periphery of the rotation plate RP, is referred to as a first side of the moving holes MH and the other side of the both sides of the moving holes MH, which is closest to the center portion of the rotation plate RP, is referred to as a second side of the moving holes MH.

The first pin unit PIN1 is arranged at the second side of the corresponding moving hole MH. When the rotation member 120 is rotated, the first pin unit PIN1 moves back and forth between the first and second sides of the corresponding moving hole MH. This will be described in detail with reference to FIGS. 4 and 5.

Figure 3:
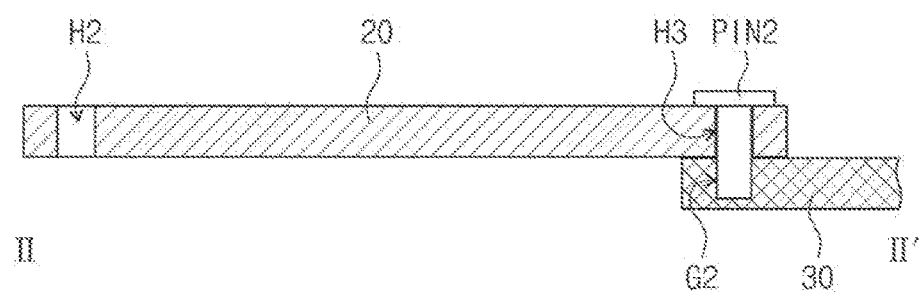
FIG. 3 is a cross-sectional view taken along line II-II' shown in FIG. 2.

FIG. 3 is a cross-sectional view taken along line II-II' shown in FIG. 2.

FIG. 3 shows the connection structure between the second moving bar 20 and the first rotation unit 30.

Referring to FIG. 3, the second pin unit PIN2 is inserted into the third hole H3 of the corresponding moving bar 20 and the second groove G2 of the corresponding first rotation unit 30. Accordingly, the second moving bar 20 is connected to the first rotation unit 30 by the second pin unit PIN2.

The second pin units PIN not shown in FIG. 3 are inserted into the third holes H3 of the corresponding second moving bars 20 and the corresponding grooves of the third and fourth grooves G3 and G4.

Figure 4:
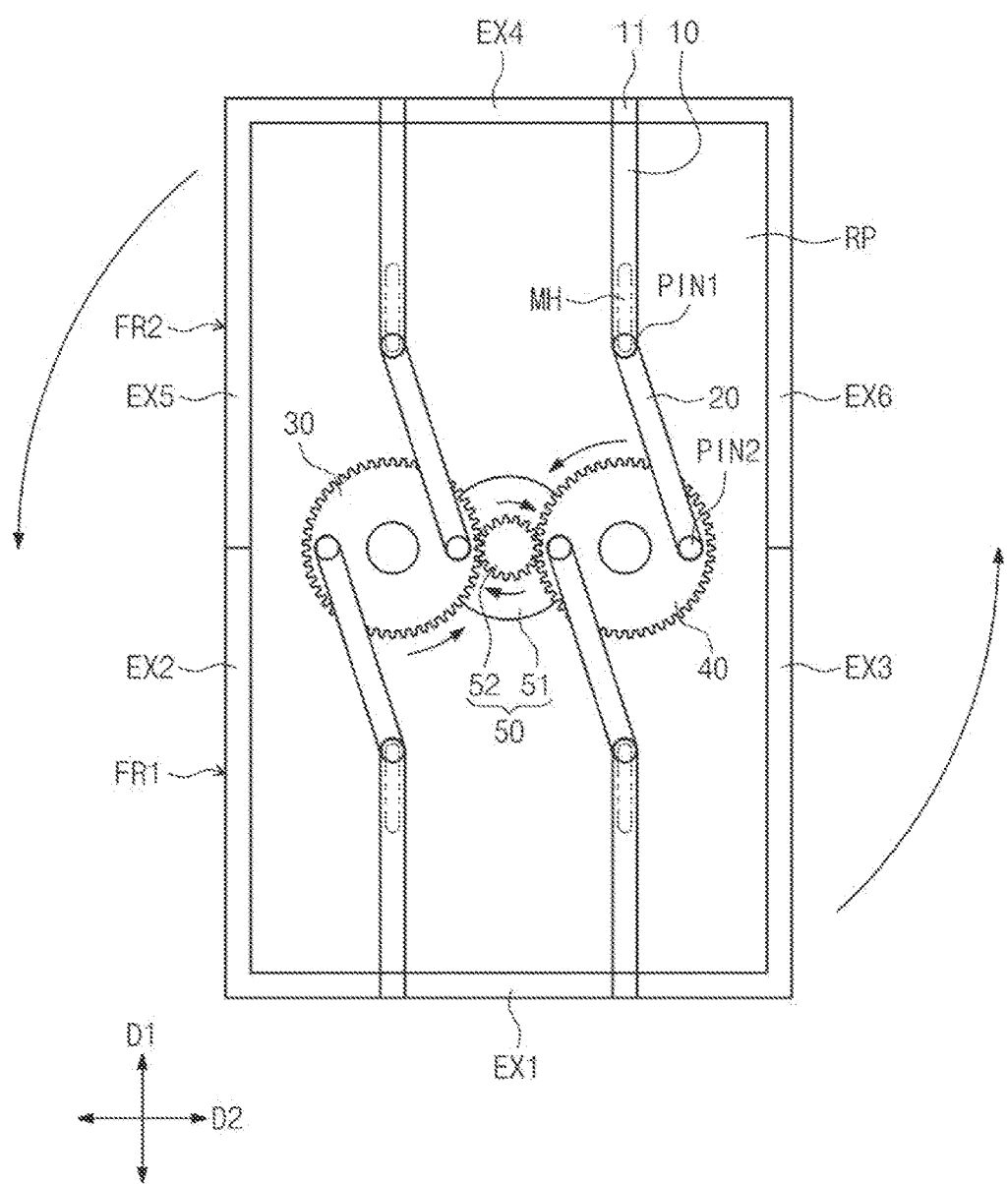
FIG. 4 is a plan view showing the display device of FIG. 1.
Figure 5:
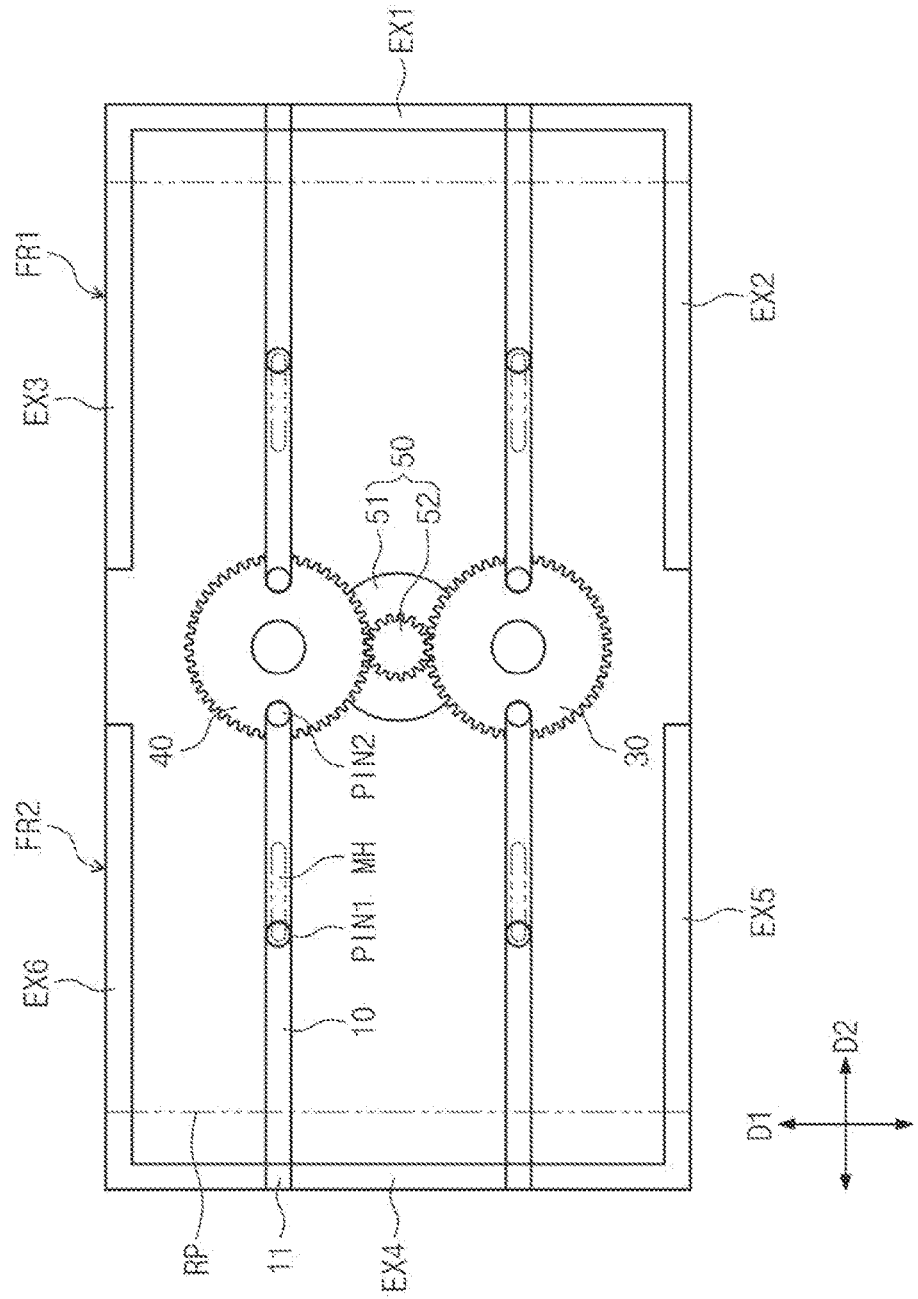
FIG. 5 is a view showing a rotation plate rotating in a predetermined direction shown in FIG. 4.

FIG. 4 is a plan view showing the display device 100 of FIG. 1 and FIG. 5 is a view showing the rotation plate RP rotating in a predetermined direction shown in FIG. 4.

For the sake of clarity, FIGS. 4 and 5 show only the first and second moving bars 10 and 20, the first and second pin units PIN1 and PIN2, the rotation plate RP, the first and second rotation units 30 and 40, the moving holes MH, the first and second frame members FR1 and FR2, and the center axis member 50. Hereinafter, the rotation operation of the rotation plate RP will be described in detail.

Referring to FIGS. 4 and 5, the rotation plate RP rotates in a predetermined direction due to an external force applied thereto. For instance, the rotation plate RP rotates about 90 degrees in a counter-clockwise direction.

The fixing gear part 52 of the center axis member 50 maintains a fixed state. When the rotation plate RP rotates, the saw-toothed wheels of the outer circumference surface of each of the first and second rotation units 30 and 40 are interlocked with the saw-toothed wheels of the fixing gear part 52 to be rotated.

The first and second rotation units 30 and 40 revolve in the same direction as the rotation direction of the rotation plate RP along the outer circumference surface of the fixing gear part 52. In addition, each of the first and second rotation units 30 and 40 rotates in the same direction as the rotation direction of the rotation plate RP.

For instance, as shown in FIGS. 4 and 5, since the rotation plate RP rotates in the counter-clockwise direction, the first and second rotation units 30 and 40 revolve in the counter-clockwise direction along the outer circumference surface of the fixing gear part 52. In addition, since the rotation plate RP rotates in the counter-clockwise direction, each of the first and second rotation units 30 and 40 rotates in the counter-clockwise direction.

Further, since the fixing gear part 52 is interlocked with each of the first and second rotation units 30 and 40, the fixing gear part 52 rotates in an opposite direction to the first and second rotation units 30 and 40. As described above, the fixing gear part 52 is fixed to the center of the fixing plate FP via the supporting plate 51. Accordingly, the fixing gear part 52 rotates in the same direction as the fixing plate FP.

That is, the fixing plate FP and the fixing gear part 52 rotate in the opposite direction to the rotation plate RP.

When the rotation plate RP rotates about 90 degrees in the counter-clockwise direction, the first pin units PIN1 arranged at the second sides of the moving holes MH before the rotation plate RP rotates move to the first sides of the moving holes MH after the rotation plate RP rotates. When the first pin units PIN1 move to the first sides of the moving holes MH, the first sides of the first moving bars 10 move to the outer place than the rotation plate RP in the second direction D2.

The first sides of the first moving bars 10 are connected to the first extension part EX1 of the first frame member FR1 and the fourth extension part EX4 of the second frame member FR2. When the rotation plate RP rotates, the first moving bars 10 move, and then the first and second frame members FR1 and FR2 are separated from each other such that the first and second frame members FR1 and FR2 move away from each other in the second direction D2 due to the movement of the first moving bars 10. Therefore, the first extension part EX1 of the first frame member FR1 and the fourth extension part EX4 of the second frame member FR2 move away from each other in the second direction D2.

When the rotation plate RP rotates about 90 in the counter-clockwise direction and returns to its original position, the first pin units PIN1 move to the second sides of the moving holes MH. That is, each of the first pin units PIN1 moves back and forth between the first and second sides of the corresponding moving hole MH by the rotation of the rotation plate RP.

Figure 6:
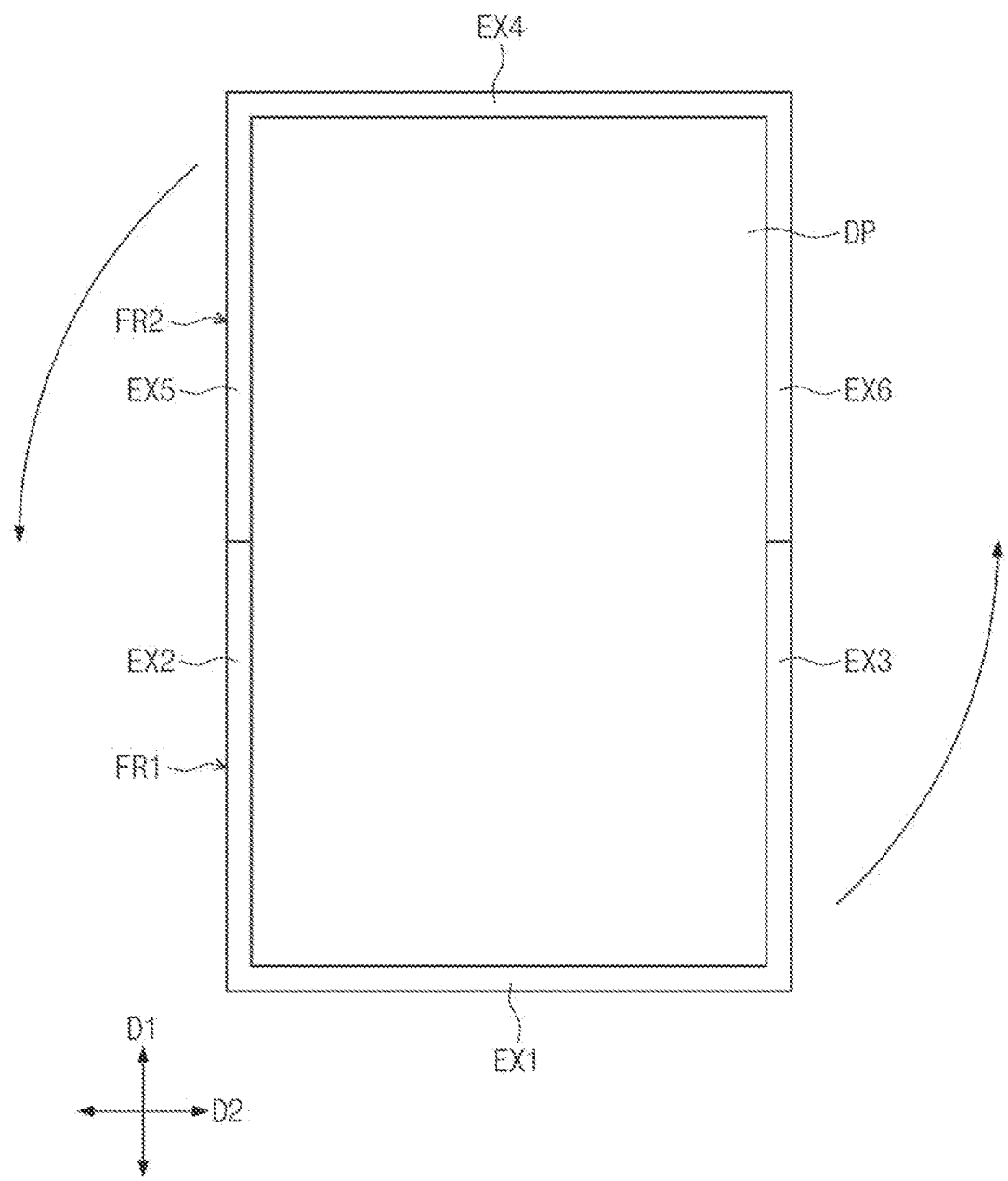
FIG. 6 is a plan view showing a display part corresponding to the display device shown in FIG. 4.
Figure 7:
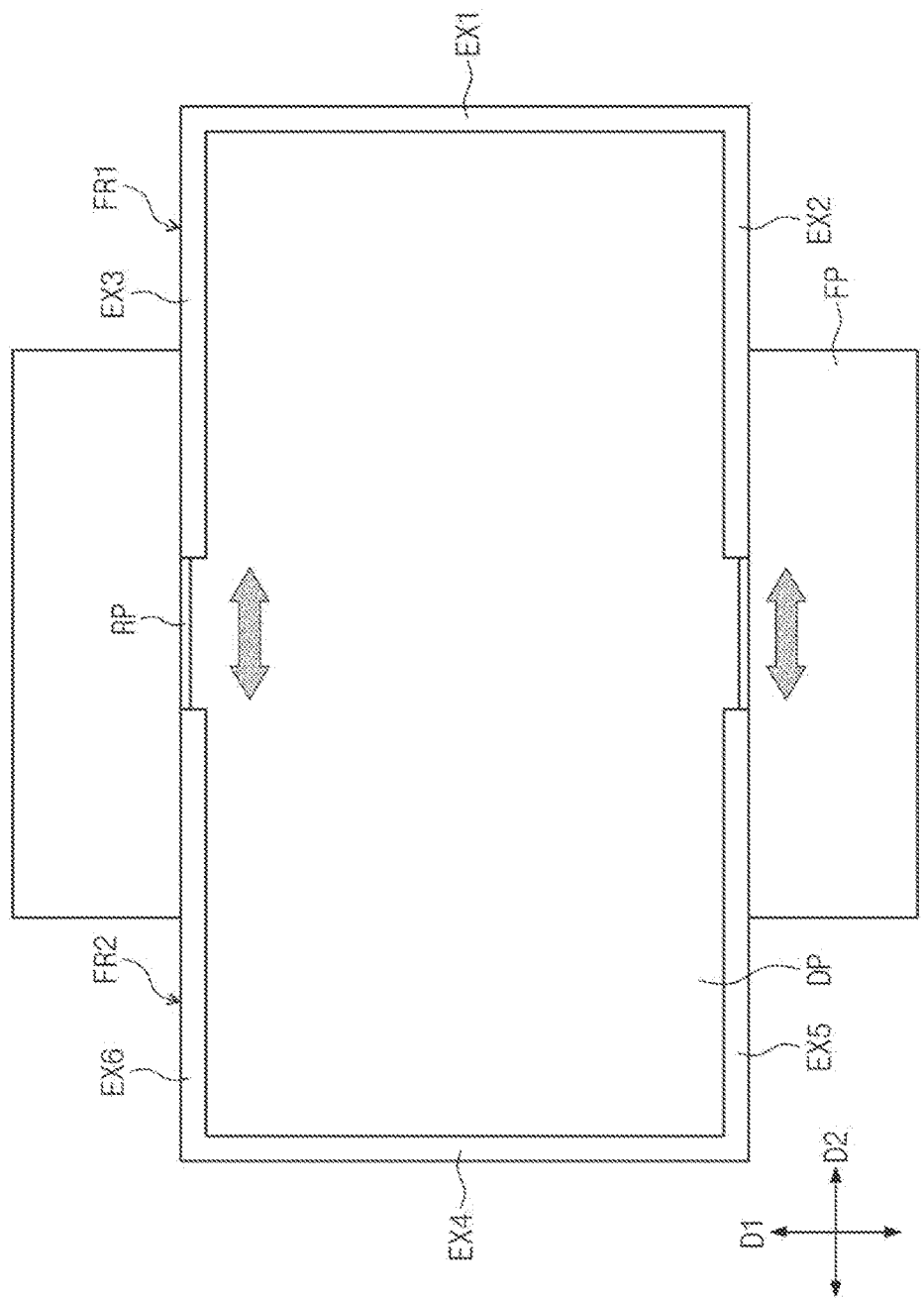
FIG. 7 is a plan view showing a display part corresponding to the display device shown in FIG. 5.

FIG. 6 is a plan view showing the display part corresponding to the display device shown in FIG. 4 and FIG. 7 is a plan view showing the display part corresponding to the display device shown in FIG. 5.

For the convenience of explanation, FIGS. 6 and 7 show only the display panel DP, the first and second frame members FR1 and FR2, and the rotation plate RP, and the fixing plate FP.

Referring to FIGS. 6 and 7, the first and second frame members FR1 and FR2 are separated from each other such that the first and second frame members FR1 and FR2 move away from each other in the second direction D2 by the rotation of the rotation plate RP. As described above, the both short sides of the display panel DP are respectively fixed to the first and fourth extension parts EX1 and EX4.

Since the first extension part EX1 of the first frame member FR1 and the fourth extension part EX4 of the second frame member FR2 move away from each other, the display panel DP can be tensioned in the second direction D2. That is, the display panel DP can be tensioned to allow the both short sides of the display panel DP to move away from each other.

Consequently, the display device 10 according to at least one exemplary embodiment can be easily tensioned.

Although exemplary embodiments have been described, it is understood that the invention should not be limited to these exemplary embodiments but various changes and modifications can be made by one ordinary skilled in the art within the spirit and scope of the inventive technology as hereinafter claimed.

What is claimed is:
1. A stretchable display, comprising:
a display unit that is stretchable;
a rotation member arranged below the display unit and connected to the display unit, wherein the rotation member is configured to stretch the display unit; and
a fixing member arranged below the rotation member and including a center axis member disposed at a center portion of the fixing member,
wherein the rotation member is further configured to rotate about the center axis member so as to stretch the display unit.

2. The display of claim 1, wherein the display unit comprises:
a display panel comprising a display area and a non-display area surrounding the display area, wherein the display panel is stretchable; and
a frame member having a frame shape corresponding to the shape of the display panel,
wherein the frame member accommodates the non-display area, and
wherein the display panel has a pair of long sides extending in a first direction and a pair of short sides extending in a second direction crossing the first direction.

3. The display of claim 2, wherein the frame member comprises a first frame member and a second frame member which are configured to contact each other to form the frame shape and accommodate the non-display area, wherein opposing sides of the display panel in the first direction are respectively connected to the first and second frame members, and wherein the first and second frame members are configured to be separated from each other when the display unit is tensioned.

4. The display of claim 3, wherein the first frame member comprises:
a first extension part extending in the second direction; and
second and third extension parts respectively extending from opposing ends of the first extension part in the first direction,
wherein the second frame member comprises:
a fourth extension part extending in the second direction; and
fifth and sixth extension parts respectively extending from opposing ends of the fourth extension part in the first direction, and
wherein the fifth and sixth extension parts are configured to respectively contact the second and third extension parts.

5. The display of claim 4, wherein the non-display areas formed on opposing sides of the display panel in the first direction are respectively connected to and fixed to the first extension part and the fourth extension part.

6. The display of claim 5, wherein each of the first to sixth extension parts comprises a first groove recessed from inner surfaces of the first to sixth extension parts, and wherein the non-display area of the display panel is inserted into the first grooves.

7. The display of claim 5, wherein the second and third extension parts are configured to be respectively separated from the fifth and sixth extension parts when the display panel is tensioned.

8. The display of claim 2, further comprising:
a rotation plate comprising a plurality of slots, each extending in the first direction, wherein the rotation plate overlaps the frame member and is configured to rotate with respect to the fixing member;
a plurality of first bars arranged on the rotation plate to respectively correspond to the slots, wherein the first bars extend in the first direction and are each connected to one of opposing sides of the frame member in the first direction;

a plurality of second bars arranged below the rotation plate and extending in the first direction;

a plurality of first pins respectively inserted in the slots of the rotation plate to connect each of the first moving bars to a corresponding one of the second moving bars;

first and second gears arranged in the second direction and configured to rotate in the same direction as the rotation plate with respect to the fixing member; and a plurality of second pins respectively connecting the second bars to the first and second gears.

9. The display of claim 8, wherein the slots are respectively formed at positions spaced apart from opposing sides of the rotation plate in the first direction, and wherein the slots formed adjacent to one side of the rotation plate in the first direction substantially directly oppose the slots formed adjacent to the opposing side of the rotation plate in a one-to-one correspondence.

10. The display of claim 8, wherein the length of the first and second bars in the first direction is greater than the length of the slots in the first direction and the width of the first and second bars in the second direction is greater than the width of the slots in the second direction.

11. The display of claim 8, wherein each of the first bars has first and second sides opposing each other, wherein the display further comprises a plurality of fixing units respectively arranged on the first sides of the first bars, wherein the first sides of the first bars a closer to the periphery of the rotation plate than the second sides of the first bars in the first direction, and wherein the fixing units respectively connect the first sides of the first bars to the respective opposing side of the frame member in the first direction.

12. The display of claim 11, wherein each of the first moving bars comprises a first hole formed in the second side thereof, wherein each of the second bars has first and second sides opposing each other, wherein each of the second bars comprises a second hole formed in the first side thereof, wherein the first sides of the second bars are closer to the periphery of the rotation plate than the second sides of the second bars in the first direction, wherein third holes are respectively formed in the second sides of the second moving bars, and wherein the second holes respectively overlap the first holes of the first bars.

13. The display of claim 12, wherein each of the first pin units has a substantially cylindrical shape elongated in a third direction crossing the first and second directions and wherein each of the first pins is inserted into a corresponding one of the first holes, a corresponding one of the slots, and a corresponding one of the second holes.

14. The display of claim 13, further comprising a plurality of nuts respectively connected to lower portions of the first pins.

15. The display of claim 13, wherein each of the slots has first and second ends and wherein each of the first pins is configured to move back and forth between the first and second ends of the corresponding slot when the rotation plate rotates.

16. The display of claim 8, wherein each of first and second gears has a substantially cylindrical shape and is arranged within the boundary of the rotation plate in the second direction, and wherein an outer circumference surface of each of the first and second gears has a substantially saw-toothed wheel shape.

17. The display of claim 16, wherein the first gear comprises a plurality of second grooves recessed from an upper surface of the first gear and arranged in the second direction, wherein the second grooves are respectively formed adjacent to opposing sides of the first gear, wherein the second gear comprises a plurality of third grooves recessed from an upper surface of the second gear and alTanged in the second direction, wherein the third grooves are respectively formed adjacent to opposing sides of the second gear, and wherein each of the second and third grooves overlaps a corresponding one of the third holes.

18. The display of claim 17, wherein each of the second pin units has a substantially cylindrical shape elongated in a third direction crossing the first and second directions and wherein each of the second pins is inserted into a corresponding one of the third holes and a corresponding one of the second and third grooves.

19. The display of claim 17, wherein the fixing member further comprises:

a fixing plate overlapping the rotation plate;

a supporting plate fixed to a center of the fixing plate; and a fixing gear attached to a center of the supporting plate and having a substantially cylindrical shape elongated in the third direction, wherein an outer circumference surface of the fixing gear has a saw-toothed wheel shape, and wherein the outer circumference surface of the first and second gears interlocks with the outer circumference surface of the fixing gear.

\* \* \* \* \*